US012640362B2

(12) United States Patent
Yi et al.

(10) Patent No.: US 12,640,362 B2
(45) Date of Patent: May 26, 2026

(54) NEGATIVE ELECTRODE MATERIAL, ELECTRODE PLATE CONTAINING SAME, ELECTROCHEMICAL DEVICE, AND ELECTRONIC DEVICE

(71) Applicant: Ningde Amperex Technology Limited, Ningde City (CN)

(72) Inventors: Ting Yi, Ningde (CN); Hang Cui, Ningde (CN); Yuansen Xie, Ningde (CN)

(73) Assignee: Ningde Amperex Technology Limited, Ningde (CN)

( * ) Notice: Subject to any disclaimer, the term of this patent is extended or adjusted under 35 U.S.C. 154(b) by 595 days.

(21) Appl. No.: 17/707,697

(22) Filed: Mar. 29, 2022

(65) Prior Publication Data

US 2022/0231273 A1 Jul. 21, 2022

Related U.S. Application Data

(63) Continuation of application No. PCT/CN2020/086616, filed on Apr. 24, 2020.

(51) Int. Cl.
*H01M 4/134* (2010.01)
*H01M 4/02* (2006.01)

(52) U.S. Cl.
CPC ...... *H01M 4/134* (2013.01); *H01M 2004/021* (2013.01); *H01M 2004/027* (2013.01)

(58) Field of Classification Search
CPC ........... H01M 4/134; H01M 2004/021; H01M 2004/027
See application file for complete search history.

(56) References Cited

U.S. PATENT DOCUMENTS

| | | | | |
|---|---|---|---|---|
| 2013/0052533 A1* | 2/2013 | Chun | ..................... | H01M 4/483 |
| | | | | 252/182.1 |
| 2018/0226648 A1* | 8/2018 | Takahashi | ............. | H01M 4/134 |
| 2019/0148762 A1* | 5/2019 | Torita | ............... | H01M 10/0525 |
| | | | | 429/209 |

(Continued)

FOREIGN PATENT DOCUMENTS

| | | |
|---|---|---|
| CN | 101192666 A | 6/2008 |
| CN | 102460784 A | 5/2012 |

(Continued)

OTHER PUBLICATIONS

ISR for International Application PCT/CN2020/086616 mailed Jan. 26, 2021.

(Continued)

*Primary Examiner* — Nicholas A Smith
*Assistant Examiner* — Zheng Lu
(74) *Attorney, Agent, or Firm* — Maier & Maier, PLLC

(57) ABSTRACT

A negative electrode material, including an oxygen-containing silicon material. In a Raman spectrum of the oxygen-containing silicon material, $I_A$ represents a peak intensity at a corresponding peak position of 140 cm$^{-1}$±10 cm$^{-1}$ in the Raman spectrum, $I_D$ represents a peak intensity at a corresponding peak position of 470 cm$^{-1}$±10 cm$^{-1}$ in the Raman spectrum, and $I_E$ represents a peak intensity at a corresponding peak position of 510 cm$^{-1}$±10 cm$^{-1}$ in the Raman spectrum; and $0<I_A/I_D<2$, and $0≤I_E/I_A<5$. In this way, after the electrochemical device containing the negative electrode material is cycled, all crystalline silicon is converted into non-crystalline silicon, thereby decreasing the volume change of the negative electrode material in the electrochemical device and improving the cycle performance and expansion performance of the electrochemical device.

17 Claims, 1 Drawing Sheet

Raman shift (cm$^{-1}$)

(56)     References Cited

U.S. PATENT DOCUMENTS

| | | | | |
|---|---|---|---|---|
| 2019/0393503 | A1* | 12/2019 | Takano | H01M 4/583 |
| 2020/0235383 | A1* | 7/2020 | Shin | H01M 4/364 |
| 2021/0135209 | A1* | 5/2021 | Hayner | H01M 10/0525 |
| 2021/0363020 | A1* | 11/2021 | Park | H01M 4/1391 |

FOREIGN PATENT DOCUMENTS

| | | | |
|---|---|---|---|
| CN | 104854740 | A | 8/2015 |
| CN | 105932268 | A | 9/2016 |
| CN | 109324030 | A | 2/2019 |
| CN | 110034282 | A | 7/2019 |
| CN | 111029543 | A | 4/2020 |
| EP | 3598541 | A1 | 1/2020 |
| JP | 2011003432 | A | 1/2011 |
| JP | 2016164870 | A | 9/2016 |
| WO | 2015004834 | A1 | 1/2015 |
| WO | 2017007013 | A1 | 1/2017 |
| WO | 2019167581 | A1 | 9/2019 |

OTHER PUBLICATIONS

Sunyoung Yoo et al, "Characterizing local structure of SiOx using confocal u-Raman spectroscopy and its effects on electrochemical property", Electrochimica Acta, vol. 212, Jun. 29, 2016, pp. 69-72, sec. 2.1, 2.2, 3.1, figs. 1-4, table 1.

Extended European Search Report and written opinion for EP application No. 20932637, mailed Jun. 30, 2022.

First Office Action of Indian Patent Application No. 2022227067198, mailed Jan. 31, 2023.

First Office Action of Japanese Patent Application No. 2021533503, mailed Aug. 2, 2022.

Final Office Action of Japanese Patent Application No. 2021533503, mailed Mar. 7, 2023.

Second Office Action of Chinese Patent Application No. 202080006948, mailed Jul. 5, 2022.

Decision of Refusal for Chinese Patent Application No. 202080006948, mailed Jan. 28, 2023.

* cited by examiner

NEGATIVE ELECTRODE MATERIAL, ELECTRODE PLATE CONTAINING SAME, ELECTROCHEMICAL DEVICE, AND ELECTRONIC DEVICE

CROSS-REFERENCE TO RELATED APPLICATION

This application is a continuation of International Patent Application No. PCT/CN2020/086616, filed on Apr. 24, 2020, the disclosure of which is hereby incorporated by reference in its entirety.

TECHNICAL FIELD

This application relates to the electrochemical field, and in particular, to a negative electrode material, an electrode plate containing same, an electrochemical device, and an electronic device.

BACKGROUND

Lithium-ion batteries are widely used in the field of consumer electronics by virtue of characteristics such as a high specific energy, a high working voltage, a low self-discharge rate, a small size, and a light weight. With rapid development of electric vehicles and portable electronic devices, people are posing higher requirements on relevant features of a lithium-ion battery such as energy density, safety, and cycle performance. A silicon-based material possesses a theoretical gram capacity of up to 4200 mAh/g, and is considered to be a next-generation lithium-ion negative electrode material that takes on the most promising application prospect. However, during a charge and discharge cycle, the volume of the silicon-based material changes enormously with the intercalation and deintercalation of lithium ions. The volume change is typically higher than 300%. Consequently, the silicon-based material is pulverized and detached from a current collector, thereby impairing conductivity of a negative electrode and deteriorating the cycle performance of the lithium-ion battery.

SUMMARY

An objective of this application is to provide a negative electrode material, an electrode plate containing same, an electrochemical device, and an electronic device to mitigate the problems that the volume change of the negative electrode material is huge and that the cycle performance is low. Specific technical solutions are described below.

A first aspect of this application provides a negative electrode material, including an oxygen-containing silicon material.

In a Raman spectrum of the oxygen-containing silicon material, $I_A$ represents a peak intensity at a corresponding peak position of 140 cm$^{-1}$±10 cm$^{-1}$ in the Raman spectrum, $I_D$ represents a peak intensity at a corresponding peak position of 470 cm$^{-1}$±10 cm$^{-1}$ in the Raman spectrum, and $I_E$ represents a peak intensity at a corresponding peak position of 510 cm$^{-1}$±10 cm$^{-1}$ in the Raman spectrum.

The negative electrode material satisfies: $0<I_A/I_D<2$, and $0\leq I_E/I_A<5$.

In an implementation solution of this application, the negative electrode material satisfies: $0<I_A/I_D<2$, and $I_E/I_A=0$.

In an implementation solution of this application, in a Raman spectrum of the oxygen-containing silicon material, $I_B$ represents a peak intensity at a corresponding peak position of 290 cm$^{-1}$±10 cm$^{-1}$ in the Raman spectrum, and $I_C$ represents a peak intensity at a corresponding peak position of 390 cm$^{-1}$±10 cm$^{-1}$ in the Raman spectrum.

In an implementation solution of this application, a chemical formula of the oxygen-containing silicon material is SiO$_x$, $0.5<x<1.6$, and D$_{v50}$ of the oxygen-containing silicon material is 5.5 μm to 10 μm.

In an implementation solution of this application, carbon exists on a surface of the oxygen-containing silicon material. In the Raman spectrum of the oxygen-containing silicon material, a relationship between I$_{1350}$ and I$_{1580}$ satisfies: $0<I_{1350}/I_{1580}<2.5$.

A second aspect of this application provides a negative electrode plate, including an adhesive layer. The adhesive layer includes a binder and the negative electrode material according to the second aspect.

In an implementation solution of this application, the adhesive layer further includes graphite. The graphite includes at least one of natural graphite or artificial graphite.

In an implementation solution of this application, the oxygen-containing silicon material in the negative electrode plate is 1% to 99% of the adhesive layer by mass.

In an implementation solution of this application, the oxygen-containing silicon material in the negative electrode plate is preferably 10% to 95% of the adhesive layer by mass.

In an implementation solution of this application, the binder includes at least one of polyacrylate, polyimide, polyamide, polyamide imide, polyvinylidene difluoride, styrene butadiene rubber, sodium alginate, polyvinyl alcohol, polytetrafluoroethylene, poly acrylonitrile, sodium carboxymethyl cellulose, potassium carboxymethyl cellulose, sodium hydroxypropyl cellulose, or potassium hydroxypropyl cellulose.

A third aspect of this application provides an electrode assembly, including the negative electrode plate according to the second aspect.

A fourth aspect of this application provides an electrochemical device, including the electrode assembly according to the third aspect.

In an implementation solution of this application, an expansion rate of the electrochemical device is 5.9% to 9.1%.

A fifth aspect of this application provides an electronic device, including the electrochemical device according to the fourth aspect.

With the negative electrode material, the electrode plate containing same, the electrochemical device, and the electronic device that are provided in this application, the negative electrode material is controlled to satisfy: $0<I_A/I_D<2$ and $0\leq I_E/I_A<5$. In this way, after the electrochemical device containing the negative electrode material is cycled, all crystalline silicon is converted into non-crystalline silicon, thereby decreasing the volume change of the negative electrode material in the electrochemical device and improving the cycle performance and anti-expansion performance of the electrochemical device.

BRIEF DESCRIPTION OF DRAWINGS

To describe the technical solutions in this application or the prior art more clearly, the following outlines the drawings to be used in the embodiments of this application or the prior art. Evidently, the drawings outlined below are merely about some embodiments of this application, and a person of ordinary skill in the art may derive other technical solutions from the drawings without making any creative effort.

DETAILED DESCRIPTION

To make the objectives, technical solutions, and advantages of this application clearer, the following describes this application in further detail with reference to drawings and embodiments. Evidently, the described embodiments are merely a part of but not all of the embodiments of this application. All other technical solutions derived by a person of ordinary skill in the art based on the embodiments of this application without making any creative effort fall within the protection scope of this application.

It needs to be noted that in specific embodiments of this application, this application is construed by using a lithium-ion battery as an example of the electrochemical device, but the electrochemical device according to this application is not limited to the lithium-ion battery.

This application provides a negative electrode material, including an oxygen-containing silicon material. In a Raman spectrum of the oxygen-containing silicon material, $I_A$ represents a peak intensity at a corresponding peak position of 140 cm$^{-1}$±10 cm$^{-1}$ in the Raman spectrum, $I_D$ represents a peak intensity at a corresponding peak position of 470 cm$^{-1}$±10 cm$^{-1}$ in the Raman spectrum, and $I_E$ represents a peak intensity at a corresponding peak position of 510 cm$^{-1}$±10 cm$^{-1}$ in the Raman spectrum.

The negative electrode material satisfies: $0 < I_A/I_D < 2$, and $0 \leq I_E/I_A < 5$.

In an implementation solution of this application, the negative electrode material satisfies: $0 < I_A/I_D < 2$, and $I_E/I_A = 0$.

Figure 1:
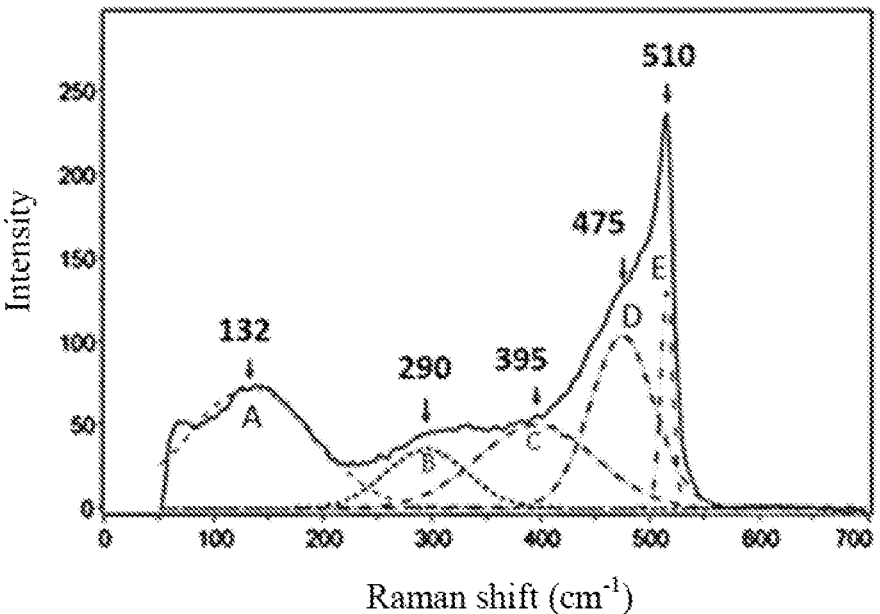
FIG. 1 is a Raman spectrum of an oxygen-containing silicon material prepared according to Embodiment 2 of this application, where the Raman spectrum is obtained through a Raman test.

In this application, FIG. 1 is a Raman spectrum of an oxygen-containing silicon material prepared according to Embodiment 2 of this application, where the Raman spectrum is obtained through a Raman test. In the drawing, a solid curve is an actual Raman spectrum, and a dashed curve is a curve used to represent a characteristic peak and obtained by separating a peak of the Raman spectrum. In the Raman spectrum, a characteristic peak within a range of 50 cm$^{-1}$ to 550 cm$^{-1}$ is a characteristic peak of the silicon element. From the dashed curves, 5 characteristic peaks can be seen: a characteristic peak A is located at 140 cm$^{-1}$±10 cm$^{-1}$, a characteristic peak B is located at 290 cm$^{-1}$±10 cm$^{-1}$, a characteristic peak C is located at 390 cm$^{-1}$±10 cm$^{-1}$, a characteristic peak D is located at 470 cm$^{1}$10 cm$^{-1}$, and a characteristic peak E is located at 510 cm$^{-1}$±10 cm$^{-1}$. In the Raman spectrum, the characteristic peaks A to D are characteristic peaks of non-crystalline silicon in the oxygen-containing silicon material, and the characteristic peak E is a characteristic peak of crystalline silicon in the oxygen-containing silicon material.

It is found that the value of $I_A/I_D$ may be used to represent non-crystallinity of the negative electrode material. To be specific, the higher the value of $I_A/I_D$, the higher the non-crystallinity of the negative electrode material. Understandably, in characteristic peaks A to D, the characteristic peak A is the farthest from the characteristic peak E that represents crystalline silicon, indicating that the non-crystallinity of the characteristic peak A is the highest. The characteristic peak D is the closest to the characteristic peak E, indicating that the silicon at the characteristic peak D shows a tendency to crystallize although the silicon is still non-crystalline. Therefore, the non-crystallinity of the negative electrode material can be determined by determining the value of $I_A/I_D$. The higher the non-crystallinity of the negative electrode material, the more the negative electrode material is conducive to suppressing expansion of the lithium-ion battery during cycling.

It is also found that the value of $I_E/I_A$ may be used to represent crystallinity of the negative electrode material. To be specific, the higher the value of $I_E/I_A$, the higher the crystallinity of the negative electrode material. That is because the non-crystallinity represented by the characteristic peak A is the highest, and the characteristic peak E represents crystalline silicon. Therefore, the crystallinity of the negative electrode material can be determined by determining the value of $I_E/I_A$.

After a Raman test is performed on the negative electrode material that has not been charged or discharged according to this application, it is found that when the intensity of the characteristic peak satisfies $0 < I_A/I_D < 2$ and $0 \leq I_E/I_A < 5$, it indicates that the non-crystallinity of the negative electrode material is relatively high and is conducive to suppressing expansion the lithium-ion battery during cycling. In addition, studies show that after the lithium-ion battery containing the negative electrode material according to the application undergoes charge-discharge cycling, the intensity of the characteristic peak satisfies $0 < I_A/I_D < 2$ and $I_E/I_A = 0$. This indicates that the crystalline silicon existent in the negative electrode material is converted into non-crystalline silicon after the cycling, that is, the non-crystallinity is increased, thereby helping to suppress expansion of the lithium-ion battery during cycling.

Figure 2:
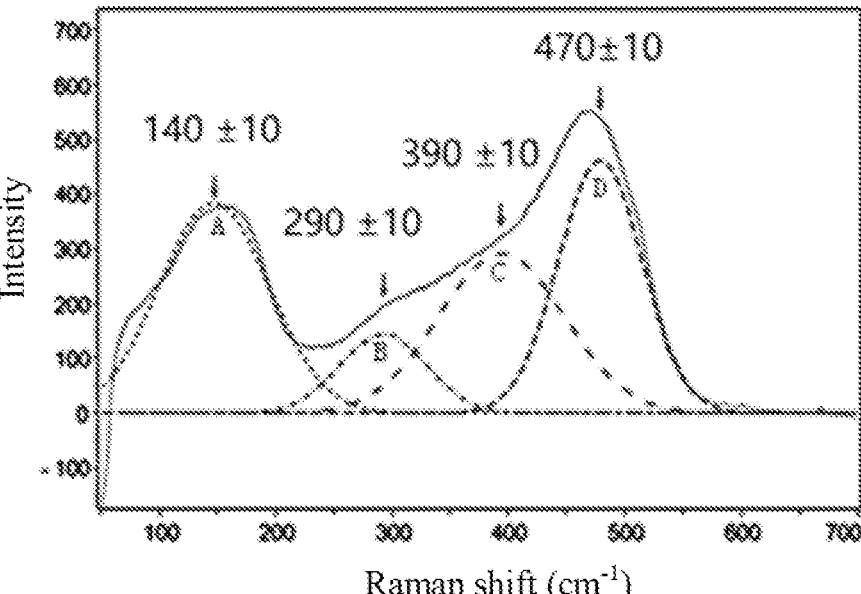
FIG. 2 is a Raman spectrum of an oxygen-containing silicon material prepared according to Embodiment 2 of this application, where the Raman spectrum is obtained through a Raman test after charge-discharge cycling.

FIG. 2 is a Raman spectrum of an oxygen-containing silicon material prepared according to Embodiment 2 of this application, where the Raman spectrum is obtained through a Raman test after at least one charge-discharge cycle. In the drawing, a solid curve is an actual Raman spectrum, and a dashed curve is a curve used to represent a characteristic peak and obtained by separating a peak of the Raman spectrum. From the dashed curves, 4 characteristic peaks can also be seen: a characteristic peak A is located at 140 cm$^{-1}$±10 cm$^{-1}$, a characteristic peak B is located at 290 cm$^{-1}$±10 cm$^{-1}$, a characteristic peak C is located at 390 cm$^{-1}$±10 cm$^{-1}$, a characteristic peak D is located at 470 cm$^{-1}$±10 cm$^{-1}$. It can be seen that all the silicon element in the oxygen-containing silicon material in the negative electrode according to this application is converted into non-crystalline silicon after the charge-discharge cycling.

In an implementation solution of this application, the chemical formula of the oxygen-containing silicon material is $SiO_x$, where $0.5 < x < 1.6$. Without being limited to any theory, when x is too small (for example, less than 0.5), a percentage of a buffer phase $SiO_2$ in the material is lower, and a percentage of silicon in the material is higher, thereby aggravating the cycle expansion. When x is too large (for example, greater than 1.6), a percentage of Si that can deintercalate lithium is lower, and a lithium intercalation capacity of the material decreases, thereby failing to achieve the purpose of increasing the energy density.

$D_{v50}$, that is, an average particle diameter, of the oxygen-containing silicon material, is 5.5 μm to 10 μm. Without being limited to any theory, if $D_{v50}$ is too low (for example, less than 5.5 μm), small particles have a large specific surface area, and are more prone to react with an electrolytic solution to generate more by-products. When $D_{v50}$ is too high (for example, greater than 10 μm), large particles change greatly in volume during cycling, and are more prone to rupture. An exposed fresh interface keeps reacting with the electrolytic solution, thereby accelerating cycle attenuation and aggravating expansion of the negative electrode.

$D_{v50}$ herein represents a particle diameter of sample particles at a cumulative volume of 50% in a volume-based particle size distribution as measured by starting from small particle diameters. The particle diameter is measured with a laser particle size analyzer.

In an implementation solution of this application, carbon exists on a surface of the oxygen-containing silicon material. To be specific, carbon may exist on at least a part of the surface of the oxygen-containing silicon material. This can be understood as: carbon exists on at least a part of the surface of the oxygen-containing silicon material, or all the surface of the oxygen-containing silicon material is wrapped by carbon, so as to improve conductivity of the negative electrode material.

Studies show that $I_{1350}$ represents a peak intensity at a corresponding peak position of 1350 $cm^{-1}$ in the Raman spectrum, and is used to represent a carbon defect. $I_{1580}$ represents a peak intensity at a corresponding peak position of 1580 $cm^{-1}$ in the Raman spectrum, and is used to represent non-defective carbon. Therefore, the lower the $I_{1350}/I_{1580}$ ratio, the lower the degree of carbon defectiveness of the negative electrode material. In an implementation solution of this application, in the Raman spectrum of the oxygen-containing silicon material with a surface on which carbon exists, a ratio of $I_{1350}$ to $I_{1580}$ satisfies: $0<I_{1350}/I_{1580}<2.5$, showing a relatively low degree of carbon defectiveness without being limited to any theory. Therefore, a graphitization degree of the material is higher, an inner-layer lattice of the carbon is large in size and scarcely defective, layers are arranged with a tendency to be parallel to each other, and interlayer spacing $d_{002}$ is small. This reduces obstacles to the flow of free electrons, reduces resistivity, increases conductivity, and enhances first-cycle Coulombic efficiency of the lithium-ion battery. However, when $I_{1350}/I_{1580}>2.5$, a relatively large number of free electrons exist in a carbon layer on the surface of the negative electrode material, and are more prone to react with the electrolytic solution to generate by-products, thereby decreasing the first-cycle Coulombic efficiency and aggravating cycle expansion.

The negative electrode material according to this application controls the crystallinity of the silicon element in the negative electrode material to make the negative electrode material satisfy: $0<I_A/I_D<2$ and $0≤I_E/I_A<5$. In this way, after the electrochemical device containing the negative electrode material is cycled, all crystalline silicon is converted into non-crystalline silicon, thereby decreasing the volume change of the negative electrode material in the electrochemical device and improving the cycle performance and anti-expansion performance of the electrochemical device.

This application further provides a negative electrode plate, including an adhesive layer. The adhesive layer includes a binder and the negative electrode material described in the implementation solution of this application.

The adhesive layer may be coated on one or two surfaces of a current collector. Depending on actual needs, a person skilled in the art may determine whether one or two surfaces are coated with the adhesive layer, without being limited in this application.

In this application, the binder is not particularly limited, and may be any binder or any combination of binders known in the art. For example, the binder may include at least one of polyacrylate, polyimide, polyamide, polyamide imide, polyvinylidene difluoride, styrene butadiene rubber, sodium alginate, polyvinyl alcohol, polytetrafluoroethylene, polyacrylonitrile, sodium carboxymethyl cellulose, potassium carboxymethyl cellulose, sodium hydroxypropyl cellulose, or potassium hydroxypropyl cellulose.

In an implementation solution of this application, the adhesive layer may further include graphite configured to increase conductivity. The graphite includes at least one of natural graphite or artificial graphite.

In an implementation solution of this application, the oxygen-containing silicon material in the negative electrode plate is 1% to 99%, and preferably 10% to 95%, of the adhesive layer by mass. Understandably, by increasing the weight percent of the oxygen-containing silicon material, the capacity of the lithium-ion battery can be increased.

This application further provides an electrode assembly, including the negative electrode plate described in the foregoing implementation solution of this application.

This application further provides an electrochemical device, including the electrode assembly described in an implementation solution of this application.

In an implementation solution of this application, an expansion rate of the electrochemical device is 5.9% to 9.1%.

The electrochemical device according to this application includes but is not limited to: any type of primary battery, secondary battery, fuel battery, solar battery, or capacitor. A typical electrochemical device is a lithium-ion battery. The lithium-ion battery is a secondary battery. The electrochemical device, such as a lithium-ion battery, generally includes a negative electrode plate, a positive electrode plate, a separator, and an electrolytic solution.

This application further provides an electronic device. The electronic device includes the electrochemical device according to an embodiment of this application.

Further, the electrochemical device may be a lithium-ion battery according to this application.

In the electrochemical device according to this application, the negative electrode plate is the negative electrode plate according to this application; and other components such as a positive electrode plate, a separator, an electrolytic solution are not particularly limited.

The positive electrode plate in this application is not particularly limited, and may be any positive electrode plate known in the art. For example, the positive electrode plate in this application may be a positive electrode plate containing lithium cobaltate, a positive electrode plate containing lithium manganate, a positive electrode plate containing lithium iron phosphate, or a positive electrode plate containing lithium nickel cobalt manganate or lithium nickel cobalt aluminate.

The electrolytic solution in this application is not particularly limited, and may be any electrolytic well known in the art. For example, the electrolytic solution may be in a gel state, or a solid state, or a liquid state. For example, the liquid-state electrolytic solution may include a lithium salt and a nonaqueous solvent.

The lithium salt is not particularly limited, and may be any lithium salt known in the art, as long as the objectives of this application can be achieved. For example, the lithium salt includes at least one of lithium hexafluorophosphate (LiPF$_6$), lithium tetrafluoroborate (LiBF$_4$), lithium difluorophosphate (LiPO$_2$F$_2$), lithium bistrifluoromethanesulfonimide LiN(CF$_3$SO$_2$)$_2$ (LiTFSI), lithium bis(fluorosulfonyl)imide Li(N(SO$_2$F)$_2$) (LiFSI), lithium bis(oxalate) borate LiB (C$_2$O$_4$)$_2$ (LiBOB), or lithium difluoro(oxalate)borate LiBF$_2$ (C$_2$O$_4$) (LiDFOB). For example, the lithium salt may be LiPF$_6$.

The nonaqueous solvent is not particularly limited, as long as the objectives of this application can be achieved. For example, the nonaqueous solvent may include at least one of carbonate compound, a carboxylate compound, an ether compound, a nitrile compound, or another organic solvent.

For example, the carbonate compound may include at least one of diethyl carbonate (DEC), dimethyl carbonate (DMC), ethyl methyl carbonate (EMC), dipropyl carbonate (DPC), methyl propyl carbonate (MPC), ethyl propyl carbonate (EPC), ethylene carbonate (EC), propylene carbonate (PC), butylene carbonate (BC), vinyl ethylene carbonate (VEC), fluoroethylene carbonate (FEC), 1,2-difluoroethylene carbonate, 1,1-difluoroethylene carbonate, 1,1,2-trifluoroethylene carbonate, 1,1,2,2-tetrafluoroethylene carbonate, 1-fluoro-2-methyl ethylene, 1-fluoro-1-methyl ethylene carbonate, 1,2-difluoro-1-methyl ethylene carbonate, 1,1,2-trifluoro-2-methyl ethylene carbonate, or trifluoromethyl ethylene carbonate.

The material of the current collector according to this application is not particularly limited, and may be a material well known to those skilled in the art. For example, the material includes at least one of copper, nickel, titanium, molybdenum, aluminum, iron, zinc, or stainless steel. Alternatively, the material of the current collector is a conductive inorganic material, for example, at least one of carbon or graphene.

The preparation process of the electrochemical device is well known to a person skilled in the art, and is not particularly limited in this application. For example, a secondary battery may be manufactured in the following process: stacking a positive electrode and a negative electrode that are interspaced with a separator, performing operations such as winding and folding as required, placing them into a battery container, injecting an electrolytic solution into the battery container, and sealing the container, where the negative electrode is the negative electrode plate according to this application.

In addition, an anti-overcurrent element, a guide plate, and the like may be placed into the battery container as required, so as to prevent pressure rise inside the battery, overcharge, and over-discharge.

This application further provides a method for preparing the negative electrode plate, including the following steps.

Preparing a Negative Electrode Material

Step A: Pulverizing and grading an amorphous silicon suboxide ingredient to obtain silicon suboxide powder, that is, an oxygen-containing silicon material. An average particle diameter of the amorphous silicon suboxide ingredient is 1 mm to 100 mm, and a chemical formula of the silicon suboxide is $SiO_x$, where $0.5<x<1.6$.

Step B: Placing the silicon suboxide powder into a chemical vapor deposition (Chemical Vapor Deposition, CVD) furnace, filling the surface with a carbon source gas, and performing CVD deposition on the silicon suboxide powder under an inert gas atmosphere to obtain a deposited silicon suboxide powder.

Step C: Demagnetizing the silicon suboxide powder obtained in step B, and then sieving the powder to obtain a negative electrode material, where a tool for the sieving is a 400-mesh sieve.

Preparing a Negative Electrode Plate

Stirring and mixing the negative electrode material, graphite, and a conductive agent to obtain a mixture A. The stirring time is not less than 120 minutes, and an orbital revolution speed of a mixer is 10 to 30 r/min.

Adding a binder into the mixture A, stirring evenly (that is, stirring for a first time), then adding deionized water, continuing to stir (that is, stirring for a second time) to obtain a mixed slurry, and then filtering the slurry with a 170-mesh double-layered sieve to obtain a negative slurry. In the stirring process, the duration of stirring for the first time is not less than 60 minutes, the duration of stirring for the second time is not less than 120 minutes, the orbital revolution speed of the mixer is 10 to 30 r/min, an axial rotation speed of the mixer is 1000 to 1500 r/min, and the mixer is an MSK-SFM-10 vacuum mixer.

Coating the negative slurry onto a copper-foil current collector, drying and then cold-pressing the current collector to obtain a negative electrode plate, where a compacted density on two sides of the current collector is 1.3 to 2.0 $g/cm^3$; and cutting the electrode plate into sheets of 74 mm×867 mm in size ready for use.

In an implementation solution of this application, step A may specifically include: mechanically pulverizing the amorphous silicon suboxide ingredient, and then pulverizing the ingredient with an airflow pulverizer to obtain a silicon suboxide powder of a particle size ranging from 0.2 μm to 30 μm, and then grading the powder to obtain a silicon suboxide powder with $D_{v50}$ ranging from 4.5 μm to 10 μm.

In an implementation solution of this application, step B may specifically include: placing the silicon suboxide powder into a CVD furnace, increasing the temperature to a value ranging from 800° C. to 1500° C., and filling the furnace with a carbon source gas with a flow rate of not less than 300 mL/min, keeping filling with the gas for at least 60 minutes and then cutting off the carbon source gas immediately, and then decreasing the temperature to a room temperature under an inert gas atmosphere, and taking out the silicon suboxide powder after the powder is cooled.

In an implementation solution of this application, a model of the amorphous silicon suboxide ingredient may be $SiO_x@C$.

In an implementation solution of this application, the carbon source gas may include at least one of $CH_4$, $C_2H_4$, $C_7H_8$, $C_2H_2$, or $C_2H_2$, and the inert gas may include at least one of Ar, $N_2$, or He.

In an implementation solution of this application, the conductive agent may further include at least one of conductive carbon black, acetylene black, Ketjen black, conductive graphite, or graphene.

In an implementation solution of this application, a viscosity of the mixed slurry is 2500 to 4000 mPa·S, and a solid content is 35% to 50%.

In an implementation solution of this application, a mass ratio between the negative electrode material, the graphite, the conductive agent, and the binder is 1% to 99%: 0.5% to 90%: 0.2% to 5%: 0.2% to 5%; and preferably, 10% to 95%: 2% to 85%: 0.5% to 5%: 0.5% to 5%. The specific dosage of the negative electrode material, the graphite, the conductive agent, and the binder is not particularly limited in this application, as long as the dosage can achieve the objectives of this application. A person skilled in the art can reasonably select the dosage of each ingredient based on the mass percent range of the ingredient.

In an implementation solution of this application, both sides may be coated, or just a single side is coated. The coating thickness on each side is 50 to 200 μm.

This application further discloses a method for preparing a lithium-ion battery, including the following steps.

Preparing a Positive Electrode Plate

Fully stirring and mixing $LiCoO_2$ as an active substance, conductive carbon black, and a binder at a mass ratio of 95 to 98:1.5 to 5:1.5 to 5 evenly in an organic solvent system, coating an aluminum foil with the mixture, performing drying and cold pressing to obtain a positive electrode plate, and cutting the electrode plate into sheets of 74 mm×867 mm in size ready for use. The binder is polyvinylidene difluoride, and the organic solvent is N-methyl-pyrrolidone.

Preparing an Electrolytic Solution

Mixing solvents ethylene carbonate (EC), dimethyl carbonate (DMC), and diethyl carbonate (DEC) at a volume ratio of 1:1:1 to obtain a mixed solution, adding fluoroethylene carbonate (FEC) and $LiPF_6$, and mixing them to obtain an electrolytic solution. In the electrolytic solution, a mass concentration of the FEC is 15 wt % to 20 wt %, and a molar concentration of the $LiPF_6$ is 0.5 to 2 mol/L.

Preparing a Lithium-Ion Battery

Using a polyethylene (PE) porous polymer film as a separator, sequentially stacking the positive electrode plate, the separator, and the negative electrode plate that are prepared above, placing the separator between the positive electrode and the negative electrode to serve a function of separation, and winding them to obtain an electrode assembly. putting the electrode assembly into an outer package, injecting the prepared electrolytic solution, and performing packaging; and performing steps such as chemical formation, degassing, and edge trimming to obtain a lithium-ion battery.

The implementations of this application are described below in more detail with reference to embodiments and comparative embodiments. Various tests and evaluations are performed in accordance with the following methods. In addition, unless otherwise specified, "fraction" and "%" mean a percent by weight.

Embodiment 1

Preparing a Lithium-Ion Battery that Includes a Negative Electrode Material with a Carbonless Surface
Preparing a Negative Electrode Material Mechanically pulverizing the amorphous silicon suboxide ingredient, and then pulverizing the ingredient with an airflow pulverizer to obtain a silicon suboxide powder, and then grading the powder to obtain a silicon suboxide powder with $D_{v50}$ being 5.5 μm, that is, an oxygen-containing silicon material.

Demagnetizing the obtained silicon suboxide powder, and then sieving the powder with a 400-mesh sieve to obtain a negative electrode material.
Preparing a Negative Electrode Plate Stirring and mixing the negative electrode material, graphite, and a conductive agent with a vacuum mixer (model MSK-SFM-10) to obtain mixture A, where the stirring time is 120 minutes, and the orbital revolution speed of the mixer is 20 r/min.

Adding a binder into the mixture A, stirring evenly, then adding deionized water, continuing to stir to obtain a mixed slurry with a solid content of 40 wt %, and then filtering the slurry with a 170-mesh double-layered sieve to obtain a negative slurry. In the stirring process, the duration of stirring for the first time is 60 minutes, the duration of stirring for the second time is 120 minutes, the orbital revolution speed of the mixer is 20 r/min, and the axial rotation speed of the mixer is 1500 r/min. The mass ratio between the negative electrode material, the graphite, the conductive agent, and the binder is 14:81:1.2:3.8.

Coating the negative slurry onto a copper-foil current collector, drying and then cold-pressing the current collector to obtain a negative electrode plate with a coating layer of 100 μm in thickness, and cutting the electrode plate into sheets of 74 mm×867 mm in size ready for use.
Preparing a Positive Electrode Plate Fully stirring and mixing $LiCoO_2$ as an active substance, conductive carbon black, and a binder at a mass ratio of 96.7:1.7:1.6 evenly in an NMP organic solvent system to obtain a positive slurry with a solid content of 75 wt %, coating an aluminum foil with the positive slurry, performing drying and cold pressing to obtain a positive electrode plate of 110 μm in thickness, and cutting the electrode plate into sheets of 74 mm×867 mm in size ready for use.
Preparing an Electrolytic Solution Mixing solvents EC, DMC, and DEC at a volume ratio of 1:1:1 to obtain a mixed solution, adding fluoroethylene carbonate (FEC) and $LiPF_6$, and mixing them to obtain an electrolytic solution. In the electrolytic solution, the mass concentration of the FEC is 10 wt %, and the molar concentration of the $LiPF_6$ is 1 mol/L.

Preparing a Lithium-Ion Battery

Using a 15 μm-thick polyethylene (PE) porous polymer film as a separator, sequentially stacking the positive electrode plate, the separator, and the negative electrode plate that are prepared above, placing the separator between the positive electrode and the negative electrode to serve a function of separation, and winding them to obtain an electrode assembly. Putting the electrode assembly into an outer package, injecting the prepared electrolytic solution, and performing packaging; and performing steps such as chemical formation, degassing, and edge trimming to obtain a lithium-ion battery.

Embodiment 2

Preparing a Lithium-Ion Battery that Includes a Negative Electrode Material with a Carbon-Containing Surface
Preparing a Negative Electrode Material Mechanically pulverizing the amorphous silicon suboxide ingredient, and then pulverizing the ingredient with an airflow pulverizer to obtain a silicon suboxide powder with a particle size ranging from 0.2 μm to 30 μm, and then grading the powder to obtain a silicon suboxide powder with $D_{v50}$ being 5.5 μm, that is, an oxygen-containing silicon material.

Placing 500 grams of the obtained silicon suboxide powder into a CVD furnace, increasing the temperature to 800° C., and filling the furnace with a carbon source gas $CH_4$ with a flow rate of 300 mL/min, keeping filling with the gas for 60 minutes and then cutting off the carbon source gas immediately, and then decreasing the temperature to a room temperature under an inert argon atmosphere, and taking out the silicon suboxide powder after the powder is cooled.

Demagnetizing the obtained silicon suboxide powder, and then sieving the powder with a 400-mesh sieve to obtain a negative electrode material.

The process of preparing a negative electrode plate, the process of preparing a positive electrode plate, the process of preparing an electrolytic solution, and the process of preparing a lithium-ion battery are the same as those described in Embodiment 1.

Embodiment 3

This embodiment is the same as Embodiment 2 except that the temperature is increased to 1000° C. for the silicon suboxide power in the CVD furnace.

Embodiment 4

This embodiment is the same as Embodiment 2 except that the temperature is increased to 1300° C. for the silicon suboxide power in the CVD furnace.

Embodiment 5

This embodiment is the same as Embodiment 2 except that the temperature is increased to 1500° C. for the silicon suboxide power in the CVD furnace.

Embodiment 6

This embodiment is the same as Embodiment 2 except that the CVD furnace containing the silicon suboxide power is filled with ethylene as the carbon source gas.

Embodiment 7

This embodiment is the same as Embodiment 2 except that the CVD furnace containing the silicon suboxide power is filled with toluene ($C_7H_8$) as the carbon source gas.

Embodiment 8

This embodiment is the same as Embodiment 2 except that the CVD furnace containing the silicon suboxide power is filled with a methane-ethylene mixture as the carbon source gas. A volume ratio between methane and ethylene in the mixture is 1:2.

Embodiment 9

This embodiment is the same as Embodiment 2 except that the CVD furnace containing the silicon suboxide power is filled with a methane-ethylene mixture as the carbon source gas. A volume ratio between methane and ethylene in the mixture is 2:1.

Comparative Embodiment 1

This embodiment is the same as Embodiment 2 except that the temperature is increased to 600° C. for the silicon suboxide power in the CVD furnace.

Comparative Embodiment 2

This embodiment is the same as Embodiment 2 except that the temperature is increased to 1800° C. for the silicon suboxide power in the CVD furnace.

Comparative Embodiment 3

This embodiment is the same as Embodiment 2 except that $D_{v50}$ of the silicon suboxide powder is 2.0 μm.

Comparative Embodiment 4

This embodiment is the same as Embodiment 2 except that $D_{v50}$ of the silicon suboxide powder is 15.0 μm.
Performance Test Performing the following methods to test the negative electrode material, the negative electrode plate, and the lithium-ion battery prepared in each embodiment and each comparative embodiment:

Raman Test for the Negative Electrode Material and the Negative Electrode Plate:

Testing, by using a spectrometer (Jobin Yvon LabRAM HR), the negative electrode material and the cycled negative electrode plate, with a light source of 532 nm and a test range of 50 $cm^{-1}$ to 4000 $cm^{-1}$, where the negative electrode plate that has undergone charge-discharge cycling is tested after being cleaned with DMC.
Particle Diameter Test:

Measuring particle size distribution with a laser particle size analyzer (MasterSizer 2000), adding 0.02 gram of a sample of the negative electrode material powder into a 50 ml clean beaker, adding 20 ml of deionized water dropwise, and then adding 2 to 3 drops of 1% surfactant to fully disperse the powder in the water, ultrasonically cleaning the negative electrode material in a 120 W ultrasonic cleaning machine for 5 minutes, and measuring the particle diameter of the negative electrode material.
Cycle Test:

Performing a cycle test on the lithium-ion battery containing the negative electrode material according to this application by the following method: charging the battery at a constant current of 0.5 C under a temperature of 25° C. until the voltage reaches 4.45 V, charging the battery at a constant voltage until the current reaches 0.025 C, leaving the battery to stand for 5 minutes, and then discharging the battery at a current of 0.5 C until the voltage reaches 3.0 V, measuring the capacity of the battery as an initial capacity, and then performing a cycle test in which the battery is charged at a current of 0.5 C and discharged at a current of 0.5 C, and calculating a ratio of the capacity of the battery in each cycle to the initial capacity, and performing 400 cycles to obtain a capacity attenuation curve.
Battery Expansion Rate Test:

Measuring the thickness of the lithium-ion battery by using a spiral micrometer when the battery is half charged (that is, 50% state of charge (SOC)); when the battery reaches the 400th cycle and is in a fully charged state (100% SOC), measuring the thickness of the battery at this time by using the spiral micrometer, and comparing the thickness at this time with the thickness of the battery that is half charged (50% SOC) initially, thereby obtaining the expansion rate of the fully charged (100% SOC) battery at this time. The preparation parameters and test results of the embodiments and comparative embodiments are shown in Table 1 below:

TABLE 1

| | | | | Raman spectrum data of silicon element of non-cycled negative electrode | | |
|---|---|---|---|---|---|---|
| Embodiments and comparative embodiments | Average particle diameter of oxygen-containing silicon material $D_{v50}$ (μm) | CVD temperature (° C.) | Carbon source | $I_{1350}/I_{1580}$ | $I_A/I_D$ | $I_E/I_A$ |
| Embodiment 1 | 5.5 | / | / | / | 1.03 | 0 |
| Embodiment 2 | 5.5 | 800 | $CH_4$ | 2.3 | 0.78 | 2.5 |
| Embodiment 3 | 5.5 | 1000 | $CH_4$ | 1.5 | 0.50 | 3.0 |
| Embodiment 4 | 5.5 | 1300 | $CH_4$ | 1.0 | 0.45 | 3.5 |
| Embodiment 5 | 5.5 | 1500 | $CH_4$ | 0.8 | 0.40 | 4.5 |
| Embodiment 6 | 5.5 | 800 | $C_2H_4$ | 0.4 | 0.77 | 2.4 |
| Embodiment 7 | 5.5 | 800 | $C_7H_8$ | 1.0 | 0.77 | 2.5 |
| Embodiment 8 | 5.5 | 800 | $CH_4:C_2H_4 = 1:2$ | 1.2 | 0.78 | 2.5 |
| Embodiment 9 | 5.5 | 800 | $CH_4:C_2H_4 = 2:1$ | 1.3 | 0.77 | 2.5 |
| Comparative Embodiment 1 | 5.5 | 600 | $CH_4$ | 4.0 | 0.83 | 1.5 |

Preparation parameters and test results of embodiments and comparative embodiments TABLE 1-continued

| Preparation parameters and test results of embodiments and comparative embodiments | | | | | |
|---|---|---|---|---|---|
| Comparative Embodiment 2 | 5.5 | 1800 | CH$_4$ | 0.6 | 0.32 | 8 |
| Comparative Embodiment 3 | 2.0 | 800 | CH$_4$ | 2.3 | 0.78 | 2.5 |
| Comparative Embodiment 4 | 15.0 | 800 | CH$_4$ | 2.3 | 0.78 | 2.5 |

| Embodiments and comparative embodiments | Raman spectrum data of silicon element of negative electrode after 400 cycles | | First-cycle Coulombic efficiency of lithium-ion battery | Capacity retention rate of lithium-ion battery after 400 cycles under 25° C. (%) | Expansion rate of lithium-ion battery after 400 cycles (%) |
|---|---|---|---|---|---|
| | $I_A/I_D$ | $I_E/I_A$ | | | |
| Embodiment 1 | 1.22 | 0 | 80 | 89.3 | 5.9 |
| Embodiment 2 | 1.05 | 0 | 85.3 | 88.2 | 7.8 |
| Embodiment 3 | 0.83 | 0 | 86.4 | 89.4 | 8.1 |
| Embodiment 4 | 0.78 | 0 | 88.2 | 90.2 | 8.4 |
| Embodiment 5 | 0.75 | 0 | 89.3 | 88.4 | 9.1 |
| Embodiment 6 | 1.05 | 0 | 90.1 | 90.7 | 6.5 |
| Embodiment 7 | 1.05 | 0 | 88 | 89.7 | 6.8 |
| Embodiment 8 | 1.05 | 0 | 87.0 | 89.4 | 7.0 |
| Embodiment 9 | 1.05 | 0 | 87.5 | 89.0 | 7.5 |
| Comparative Embodiment 1 | 1.10 | 0 | 79.1 | 86.2 | 9.3 |
| Comparative Embodiment 2 | 0.75 | 0 | 90.3 | 85.1 | 9.6 |
| Comparative Embodiment 3 | 1.05 | 0 | 84.9 | 83.3 | 9.0 |
| Comparative Embodiment 4 | 1.05 | 0 | 85.3 | 82.6 | 9.1 |

As can be seen from the comparison between Embodiment 1 and Comparative Embodiments 1 to 4 in Table 1, the cycle capacity retention rate of the lithium-ion battery is significantly increased, and the expansion rate is significantly reduced. That is because, by controlling $I_A/I_D$ that is used to represent the non-crystallinity of the silicon element in the negative electrode material, the non-crystallinity of the negative electrode material in Embodiment 1 is higher than that in Comparative Embodiments 1 to 4. By controlling $I_E/I_A$ that is used to represent crystallinity of the silicon element in the negative electrode material, the crystallinity of the negative electrode material in Embodiment 1 is 0. In this way, after 400 cycles of the lithium-ion battery, the $I_A/I_D$ ratio is higher than that in Comparative Embodiments 1 to 4, indicating that the cycled lithium-ion battery is still of a relatively high non-crystallinity. The high non-crystallinity helps to improve the cycle capacity retention and suppress the expansion rate of the lithium-ion battery.

The comparison between Embodiments 2 to 5 and Comparative Embodiments 1 and 2 shows that by using different vapor deposition temperatures, carbon layers graphitized to different degrees can be obtained. As the deposition temperature increases, the ratio between $I_{1350}$ and $I_{1580}$ in the Raman spectrum gradually decreases, proving that the graphitization degree of the material with a carbon-layer surface increases with the rise of the temperature. This increases SP$^2$ hybridization of carbon, decreases the spacing between carbon layers, increases the density of the carbon layers, decreases the specific surface area, and enhances the first-cycle Coulombic efficiency.

Evidently, a relatively low deposition temperature, such as 600° C. in Comparative Embodiment 1, is not conducive to improving the first-cycle Coulombic efficiency of the lithium-ion battery. However, as the temperature further increases, for example, when the temperature reaches 1800°

C. in Comparative Embodiment 2, the silicon in the oxygen-containing silicon material changes from a non-crystalline state to a crystalline state. As can be seen from the characterization of the Raman spectrum, in the characteristic peak of the silicon element, the $I_A/I_D$ ratio decreases, and the $I_E/I_A$ ratio increases, that is, the crystallinity increases. This increases a volume effect caused by the transformation from a crystalline phase to a non-crystalline phase in a process of lithium deintercalation, and thereby increases the expansion rate of the lithium-ion battery during cycling.

As can be seen from the comparison between Embodiment 2 and Comparative Embodiments 3 and 4, when $D_{v50}$ of the oxygen-containing silicon material is too low (for example, 2.0 µm in Comparative Embodiment 3), the cycle expansion rate of the lithium-ion battery increases significantly. A main reason is that, small particles have a large specific surface area, and are more prone to react with the electrolytic solution to generate more by-products. When $D_{v50}$ of the oxygen-containing silicon material is too high (for example, 15.0 µm in Comparative Embodiment 3), the cycle expansion rate of the lithium-ion battery also increases significantly. A main reason is that, large particles is more prone to rupture during cycling, and an exposed fresh interface keeps reacting with the electrolytic solution, thereby accelerating cycle attenuation and aggravating expansion. Therefore, it is advisable that $D_{v50}$ of the oxygen-containing silicon material is controlled to fall within 5.5 µm to 10 µm.

As can be seen from Embodiment 2 and Embodiments 6 to 9, when the percentage of double bonds in the carbon source is higher, there are more SP$^2$ hybridized carbon atoms in the carbon layer on the surface of the negative electrode material. In the carbon source, carbon in a double bond exists in SP$^2$ hybridized form, and carbon in a single bond exists in SP$^3$ hybridized form. Therefore, when there are more SP$^2$ hybridized carbon atoms, there are fewer defects, the graphitization degree is higher, the formed carbon layer is denser, and the specific surface area is smaller. When the graphitization degree is higher, there are fewer free electrons in the carbon layer, the resistance is reduced, and the conductivity is increased, thereby helping to improve the cycle capacity retention rate and decrease the expansion rate of the lithium-ion battery.

As can be seen from Comparative Embodiment 1, when $I_{1350}/I_{1580}>2.5$, a relatively large number of free electrons exist in the carbon layer of the negative electrode material, and are more prone to react with the electrolytic solution to generate by-products, thereby decreasing the first-cycle Coulombic efficiency and aggravating cycle expansion.

The foregoing descriptions are merely exemplary embodiments of this application, but are not intended to limit this application. Any modifications, equivalent substitutions, and improvements made within the spirit and principles of this application fall within the protection scope of this application.

What is claimed is:

1. A negative electrode material, comprising:
an oxygen-containing silicon material,
wherein
in a Raman spectrum of the oxygen-containing silicon material, five peaks are assigned for the devolution: $I_A$, $I_B$, $I_C$, $I_D$, and $I_E$, wherein $I_A$ represents a peak intensity at a corresponding peak position of $140 \text{ cm}^{-1}\pm10 \text{ cm}^{-1}$ in the Raman spectrum, $I_B$ represents a peak intensity at a corresponding peak position of $290 \text{ cm}^{-1}\pm10 \text{ cm}^{-1}$ in the Raman spectrum, $I_C$ represents a peak intensity at a corresponding peak position of $390 \text{ cm}^{-1}\pm10 \text{ cm}^{-1}$ in the Raman spectrum, $I_D$ represents a peak intensity at a corresponding peak position of $470 \text{ cm}^{-1}\pm10 \text{ cm}^{-1}$ in the Raman spectrum, and $I_E$ represents a peak intensity at a corresponding peak position of $510 \text{ cm}^{-1}\pm10 \text{ cm}^{-1}$ in the Raman spectrum; and
$0.5<I_A/I_D<2$, and $0\leq I_E/I_A<3$, wherein said $I_A/I_D$ and $I_E/I_A$ are measurements of a non-cycled negative electrode material,
wherein carbon exists on a surface of the oxygen-containing silicon material, and in the Raman spectrum of the oxygen-containing silicon material, $0<I_{1350}/I_{1580}<2.5$, wherein $I_{1350}$ represents a peak intensity at a corresponding peak position of $1350 \text{ cm}^{-1}$ in the Raman spectrum and $I_{1580}$ represents a peak intensity at a corresponding peak position of $1580 \text{ cm}^{-1}$ in the Raman spectrum.

2. The negative electrode material according to claim 1, wherein $I_E/I_A=0$.

3. The negative electrode material according to claim 1, wherein a chemical formula of the oxygen-containing silicon material is $SiO_x$, $0.5<x<1.6$, and an average particle diameter $D_{v50}$ of the oxygen-containing silicon material is 5.5 μm to 10 μm.

4. The negative electrode material according to claim 1, wherein $0<I_{1350}/I_{1580}\leq0.4$.

5. The negative electrode material according to claim 1, wherein $0.77\leq I_A/I_D<2$.

6. A negative electrode plate, comprising:
an adhesive layer, the adhesive layer comprises a binder and a negative electrode material, wherein the negative electrode material comprises an oxygen-containing silicon material, wherein
in a Raman spectrum of the oxygen-containing silicon material, five peaks are assigned for the devolution: $I_A$, $I_B$, $I_C$, $I_D$, and $I_E$, wherein $I_A$ represents a peak intensity at a corresponding peak position of $140 \text{ cm}^{-1}\pm10 \text{ cm}^{-1}$ in the Raman spectrum, $I_B$ represents a peak intensity at a corresponding peak position of $290 \text{ cm}^{-1}\pm10 \text{ cm}^{-1}$ in the Raman spectrum, $I_C$ represents a peak intensity at a corresponding peak position of $390 \text{ cm}^{-1}\pm10 \text{ cm}^{-1}$ in the Raman spectrum, $I_D$ represents a peak intensity at a corresponding peak position of $470 \text{ cm}^{-1}\pm10 \text{ cm}^{-1}$ in the Raman spectrum, and $I_E$ represents a peak intensity at a corresponding peak position of $510 \text{ cm}^{-1}\pm10 \text{ cm}^{-1}$ in the Raman spectrum; and
$0.5<I_A/I_D<2$, and $0\leq I_E/I_A<3$, wherein said $I_A/I_D$ and $I_E/I_A$ are measurements of a non-cycled negative electrode material,
wherein carbon exists on a surface of the oxygen-containing silicon material, and, in the Raman spectrum of the oxygen-containing silicon material, $0<I_{1350}/I_{1580}<2.5$, wherein $I_{1350}$ represents a peak intensity at a corresponding peak position of $1350 \text{ cm}^{-1}$ in the Raman spectrum and $I_{1580}$ represents a peak intensity at a corresponding peak position of $1580 \text{ cm}^{-1}$ in the Raman spectrum.

7. The negative electrode plate according to claim 6, wherein a chemical formula of the oxygen-containing silicon material is $SiO_x$, $0.5<x<1.6$, and an average particle diameter $D_{v50}$ of the oxygen-containing silicon material is 5.5 μm to 10 μm.

8. The negative electrode plate according to claim 6, wherein the adhesive layer further comprises graphite, and the graphite comprises at least one of natural graphite or artificial graphite.

9. The negative electrode plate according to claim 6, wherein the oxygen-containing silicon material in the negative electrode plate is 1% to 99% of the adhesive layer by mass.

10. An electrochemical device, comprising an electrode assembly, wherein the electrode assembly comprises a negative electrode plate, and the negative electrode plate comprises:
an adhesive layer, wherein the adhesive layer comprises a binder and a negative electrode material, the negative electrode material comprises an oxygen-containing silicon material; wherein
in a Raman spectrum of the oxygen-containing silicon material, five peaks are assigned for the devolution: $I_A$, $I_B$, $I_C$, $I_D$, and $I_E$, wherein $I_A$ represents a peak intensity at a corresponding peak position of $140 \text{ cm}^{-1}\pm10 \text{ cm}^{-1}$ in the Raman spectrum, $I_B$ represents a peak intensity at a corresponding peak position of $290 \text{ cm}^{-1}\pm10 \text{ cm}^{-1}$ in the Raman spectrum, $I_c$ represents a peak intensity at a corresponding peak position of $390 \text{ cm}^{-1}\pm10 \text{ cm}^{-1}$ in the Raman spectrum, $I_D$ represents a peak intensity at a corresponding peak position of $470 \text{ cm}^{-1}\pm10 \text{ cm}^{-1}$ in the Raman spectrum, and $I_E$ represents a peak intensity at a corresponding peak position of $510 \text{ cm}^{-1}\pm10 \text{ cm}^{-1}$ in the Raman spectrum; and
$0.5<I_A/I_D<2$, and $0\leq I_E/I_A<3$, wherein said $I_A/I_D$ and $I_E/I_A$ are measurements of a non-cycled negative electrode material,
wherein carbon exists on a surface of the oxygen-containing silicon material, and, in the Raman spectrum of the oxygen-containing silicon material, $0<I_{1350}/I_{1580}<2.5$, wherein $I_{1350}$ represents a peak intensity at a corresponding peak position of $1350 \text{ cm}^{-1}$ in the Raman spectrum and $I_{1580}$ represents a peak intensity at a corresponding peak position of $1580 \text{ cm}^{-1}$ in the Raman spectrum.

11. The electrochemical device according to claim 10, wherein an expansion rate of the electrochemical device is 5.9% to 9.1%.

12. An electronic device, comprising the electrochemical device according to claim 10.

13. The electrochemical device according to claim 10, wherein $0<I_E/I_A<3$.

14. The electrochemical device according to claim 10, wherein a chemical formula of the oxygen-containing silicon material is $SiO_x$, $0.5<x<1.6$, and an average particle diameter $D_{v50}$ of the oxygen-containing silicon material is 5.5 μm to 10 μm.

15. The electrochemical device according to claim 10, wherein the adhesive layer further comprises graphite; and the graphite comprises at least one of natural graphite or artificial graphite.

16. The electrochemical device according to claim 10, wherein the oxygen-containing silicon material in the negative electrode plate is 1% to 99% of the adhesive layer by mass.

17. The electrochemical device according to claim 10, wherein after the electrochemical device underwent 400 charge-discharge cycles, the peak intensities of the oxygen-containing silicon material satisfy:

$$0<I_A/I_D<2 \text{ and } I_E/I_A=0.$$

* * * * *